United States Patent [19]
Anglin

[11] Patent Number: 5,205,868
[45] Date of Patent: Apr. 27, 1993

[54] LOST FOAM PATTERN ASSEMBLY APPARATUS

[75] Inventor: Willie R. Anglin, Burnsville, N.C.

[73] Assignee: Outboard Marine Corporation, Waukegan, Ill.

[21] Appl. No.: 793,317

[22] Filed: Nov. 15, 1991

Related U.S. Application Data

[63] Continuation of Ser. No. 512,954, Apr. 23, 1990, abandoned.

[51] Int. Cl.$^5$ .............................................. B29C 65/52
[52] U.S. Cl. ................................ 118/263; 156/578; 118/212; 118/256
[58] Field of Search ............... 156/578; 118/212, 243, 118/256, 263, 264

[56] References Cited

U.S. PATENT DOCUMENTS

| | | | |
|---|---|---|---|
| 2,113,684 | 4/1938 | Edwards | 118/212 |
| 4,353,775 | 10/1982 | Paul | 156/540 |
| 4,572,762 | 2/1986 | Winston | 156/556 |
| 4,589,950 | 5/1986 | Sekavec, Jr. | 156/578 |
| 4,744,853 | 5/1988 | Landua et al. | 156/390 |
| 4,888,082 | 12/1989 | Fetcenko et al. | 156/578 |

*Primary Examiner*—Jan H. Silbaugh
*Assistant Examiner*—Brian J. Eastley
*Attorney, Agent, or Firm*—Michael, Best & Friedrich

[57] ABSTRACT

Apparatus for applying glue to a foam pattern section, the apparatus including a glue print plate including an upper surface having an inner raised portion surrounded by a lower portion, and a dam at least partially surrounding the lower portion for reducing squeeze-out of glue from between the inner raised portion and the pattern section.

8 Claims, 1 Drawing Sheet

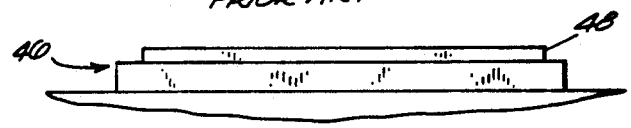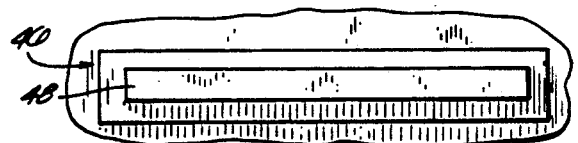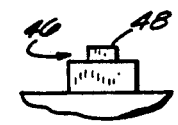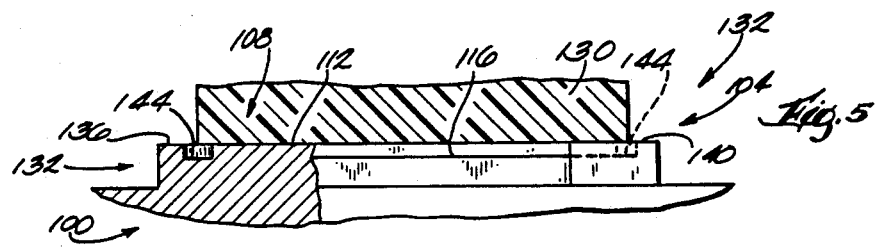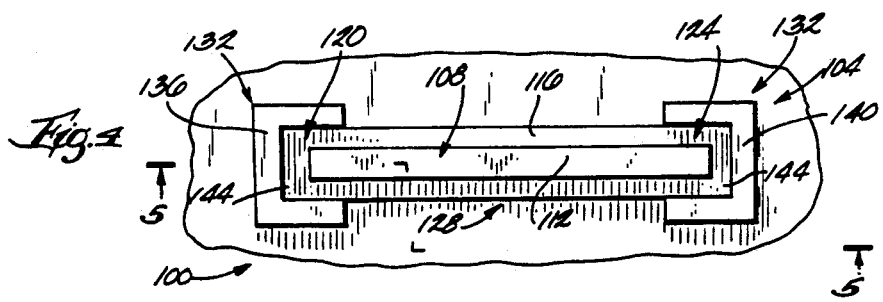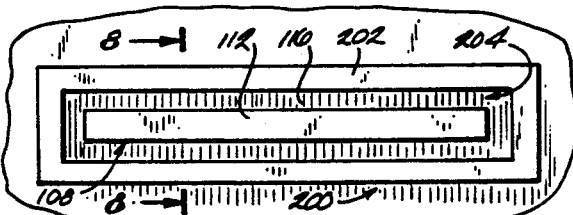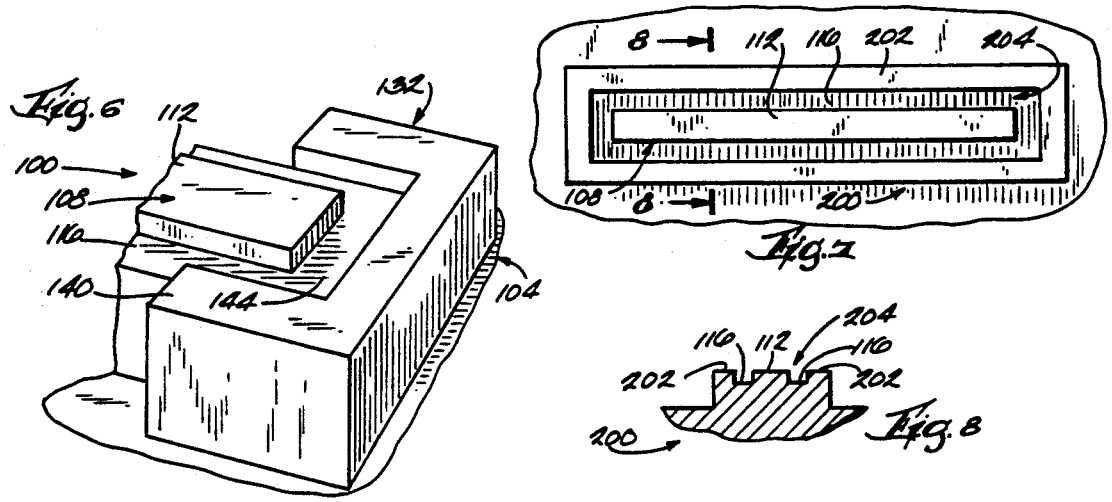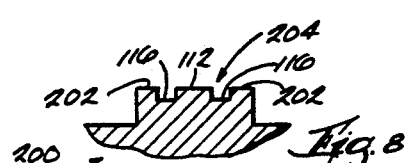

LOST FOAM PATTERN ASSEMBLY APPARATUS

This is a continuation of application No. 07/512,954, filed Apr. 23, 1990, now abandoned.

BACKGROUND OF THE INVENTION

The invention relates to apparatus for assembling evaporable foam patterns to be used in a lost foam casting process. More particularly, the invention relates to apparatus for applying glue or adhesive to a section of a foam pattern.

U.S. Winston Pat. No. 4,572,762, which is assigned to the assignee hereof, discloses an apparatus for assembling lost foam patterns. Winston discloses (see FIGS. 1-3 hereof) a glue print plate 46 including an upper surface having a raised land 48 and a depressed area surrounding the land 48. The land 48 is 0.035 inches above the depressed area of the print plate 46, and glue is picked up on the land when the print plate is submerged in hot glue. When the land is pressed against a foam pattern section, glue on the land is squeezed out from between the land and the pattern section and forms a meniscus between the edge of the land and the lower or depressed area surrounding the land.

| Sekavec, Jr. | 4,589,950 | May 20, 1986 |
| Paul | 4,353,775 | Oct. 12, 1982 |
| Laudua, et al. | 4,744,853 | May 17, 1988 |

SUMMARY OF THE INVENTION

The invention provides apparatus for applying glue to a foam pattern section, the apparatus comprising a glue print plate including an upper surface having an inner raised portion surrounded by a lower portion, and dam means at least partially surrounding the lower portion for reducing squeeze-out of glue from between the inner raised portion and the pattern section.

The invention also provides apparatus for applying glue to a foam pattern section, the apparatus comprising a glue print plate including an upper surface having an inner raised portion, a lower portion surrounding the inner raised portion, and an outer raised portion at least partially surrounding the lower portion.

The invention also provides apparatus for applying glue to a foam pattern section, the apparatus comprising a glue print plate including an upper surface having an inner raised portion, a lower portion surrounding the inner raised portion, and an outer raised portion surrounding the lower portion, the inner raised portion extending a predetermined distance above the lower portion, and the outer raised portion extending a distance substantially equal to the predetermined distance above the lower portion.

A principal feature of the invention is the provision of dam means at least partially surrounding the lower portion of a glue print plate for reducing squeeze-out of glue from between the raised portion of the print plate and a foam pattern section. This arrangement has been found to deposit more adhesive at the end of a glue joint and thereby provides a better seal or bond at the end of the joint.

Other features and advantages of the invention will become apparent to those skilled in the art upon review of the following detailed description, claims and drawings.

DESCRIPTION OF THE DRAWINGS

FIG. 1 is a plan view of a prior art glue print plate.

FIG. 2 is a side elevational view of the prior art plate shown in FIG. 1.

FIG. 3 is an end elevational view of the prior art plate shown in FIG. 1.

FIG. 4 is a plan view of a glue print plate embodying the invention.

FIG. 5 is a view taken along line 5—5 in FIG. 4.

FIG. 6 is a partial perspective view of the glue print plate shown in FIGS. 4 and 5.

FIG. 7 is a plan view of a glue plate that is an alternative embodiment of the invention.

FIG. 8 is a view taken along line 8—8 in FIG. 7.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 100 embodying the invention is illustrated in FIGS. 3-6. The apparatus 100 is part of a larger apparatus, such as the one disclosed in U.S. Pat. No. 4,572,762, which is incorporated herein by reference, for assembling lost foam patterns.

The apparatus 100 comprises a glue print plate 104 including a generally horizontal upper surface 108 having an elongated, rectangular, inner raised portion 112 surrounded by a depressed or lower portion 116. In the illustrated embodiment, the periphery of the lower portion 116 defines an elongated rectangle. The upper surface 108 also includes (see FIG. 4) opposite first and second end portions 120 and 124, respectively, each of which includes a portion of the inner raised surface portion 112 and a portion of the lower surface portion 116. The upper surface 108 also includes an intermediate portion 128 located between the end portions 120 and 124. The print plate 104 is adapted to be pressed against the lower surface of a foam pattern section 130 so that glue on the inner raised portion 112 of the upper surface 108 is applied to the foam pattern section 130.

The apparatus 100 also comprises dam means 132 at least partially surrounding the lower portion 116 for reducing squeeze-out of glue from between the inner raised portion 112 and the pattern section 130. While various suitable dam means can be employed, in the illustrated embodiment, such means includes a first outer raised portion 136 of the upper surface 108. The first outer portion 136 is spaced outwardly of the inner raised portion 112 and surrounds the first end portion 120 of the upper surface 108. The dam means also includes a second outer raised portion 140 of the upper surface 108. The second outer portion 140 is spaced outwardly of the inner raised portion 112 and surrounds the second end portion 124 of the upper surface 108. In the illustrated embodiment, the inner raised portion 112 extends a predetermined distance above the lower portion 116, and the outer raised portions 136 and 140 extend substantially the same distance above the lower portion 116.

Each outer raised portion 136 or 140 cooperates with the inner raised portion 112 and the lower portion 116 to define a C-shaped reservoir 144 at the associated end of the upper surface 108. This reservoir 144 reduces squeeze-out of glue from between the inner raised portion 112 and the pattern section 130 and thereby provides an improved glue joint between the pattern section 130 and another pattern section (not shown) to which the section 130 is glued. More particularly, this reduction of squeeze-out results in a small, raised bead of glue at the end of the glue joint. This raised bead of glue insures a good seal of the joint and reduces the effect of any stress concentration caused by a step or pattern section mismatch at the end of the glue joint.

An apparatus 200 that is an alternative embodiment of the invention is illustrated in FIGS. 7 and 8. Except as described hereinafter, the apparatus 200 is substantially identical to the apparatus 100, and common elements have been given the same reference numerals.

In the apparatus 200, the dam means includes an outer raised portion 202 that completely surrounds the lower portion 16. The inner raised portion 112 of the apparatus 200 extends a predetermined distance above the lower portion 116, and the outer raised portion 202 extends substantially the same distance above the lower portion 116. The outer raised portion 202 cooperates with the inner raised portion 112 and the lower portion 116 to define an endless, rectangular reservoir 204. The reservoir 204 reduces squeeze-out of glue from between the inner raised portion 112 and the pattern section (not shown) and thereby provides an improved glue joint between the pattern section and another pattern section (not shown) to which the first-mentioned section is glued.

Various features of the invention are set forth in the following claims.

I claim:

1. Apparatus for applying glue to a foam pattern section, said apparatus comprising a glue plate including an upper surface having an inner raised portion, a lower portion at least partially surrounding said raised portion, being spaced below said raised portion at a first distance and including a non-apertured bottom wall, and dam means at least partially surrounding said lower portion and defining with said lower portion a glue reservoir for reducing squeeze-out of glue from between said inner raised portion and the pattern section, said dam means extending upwardly from said lower portion at a distance substantially the same as said first distance.

2. Apparatus as set forth in claim 1 wherein said dam means completely surrounds said lower portion.

3. Apparatus as set forth in claim 1 wherein said dam means partially surrounds said lower portion.

4. Apparatus as set forth in claim 1 wherein said upper surface has an end portion, and wherein said dam means surrounds said end portion.

5. Apparatus as set forth in claim 1 wherein said upper surface has opposite end portions, and wherein said dam means surrounds both of said end portions.

6. Apparatus as set forth in claim 5 wherein said upper surface also includes an intermediate portion located between said end portions, and wherein said dam means does not surround said intermediate portion.

7. Apparatus as set forth in claim 1 wherein said upper surfaces also has an outer raised portion extending above said lower portion, and wherein said dam means includes said outer raised portion.

8. Apparatus as set forth in claim 7, wherein said inner raised portion extends a predetermined distance above said lower portion, and wherein said outer raised portion extends a distance substantially equal to said predetermined distance above said lower portion.

* * * * *